United States Patent
Haas et al.

[11] Patent Number: 5,988,047
[45] Date of Patent: Nov. 23, 1999

[54] BAKING DEVICE FOR PRODUCTION OF ENDLESS STRIPS

[75] Inventors: Franz Sen Haas, Vienna; Johann Haas, Klosterneuburg; Stefan Jiraschek, Vienna, all of Austria

[73] Assignee: Franz Haas Waffelmaschinen-Industrie Aktiengesellschaft, Vienna, Austria

[21] Appl. No.: 09/142,655

[22] PCT Filed: Mar. 12, 1997

[86] PCT No.: PCT/AT97/00052

§ 371 Date: Sep. 10, 1998

§ 102(e) Date: Sep. 10, 1998

[87] PCT Pub. No.: WO97/34492

PCT Pub. Date: Sep. 25, 1997

[30] Foreign Application Priority Data

Mar. 18, 1996 [AT] Austria ........................ 504/96

[51] Int. Cl.⁶ .............. A23L 1/00; A47J 37/00; A21B 1/48; A21B 5/03
[52] U.S. Cl. ............. 99/353; 99/427; 99/443 R; 99/450.1
[58] Field of Search ............ 99/353–355, 372–379, 99/386, 450.1, 443 R, 427, 443 C, 476–479; 126/21 A, 149; 198/432, 459.5; 219/388, 400; 432/112–114

[56] References Cited

U.S. PATENT DOCUMENTS

| | | | |
|---|---|---|---|
| 4,283,171 | 8/1981 | Bronnec | 432/112 |
| 4,417,508 | 11/1983 | Haas, Sr. et al. | 99/355 |
| 4,669,603 | 6/1987 | Haas, Sr. et al. | 198/432 |
| 4,694,741 | 9/1987 | Haas, Sr. et al. | 99/354 |
| 4,953,453 | 9/1990 | Haas, Sr. et al. | 99/373 |
| 5,048,403 | 9/1991 | Haas, Sr. et al. | 99/355 |
| 5,103,717 | 4/1992 | Haas, Sr. et al. | 99/353 |
| 5,463,939 | 11/1995 | Koletnik et al. | 99/353 |
| 5,795,607 | 8/1998 | Haas et al. | 99/443 C |

FOREIGN PATENT DOCUMENTS

| | | |
|---|---|---|
| 1 026 103 | 4/1953 | France . |
| 2 432 141 | 2/1980 | France . |
| 95 32630 | 12/1995 | WIPO . |

Primary Examiner—Timothy Simone
Attorney, Agent, or Firm—Herbert Dubno

[57] ABSTRACT

A baking apparatus for producing endless strips of baked dough having a drum mounted on rotatable supports offset from the axis of the drum and separating the interior of a housing of the apparatus into inner and outer chambers which can each be equipped with heating devices. Along the inner and/or outer surface of the drum for each strip, a dough application device and a strip removal device can be provided in succession so that a respective endless strip is formed.

8 Claims, 4 Drawing Sheets

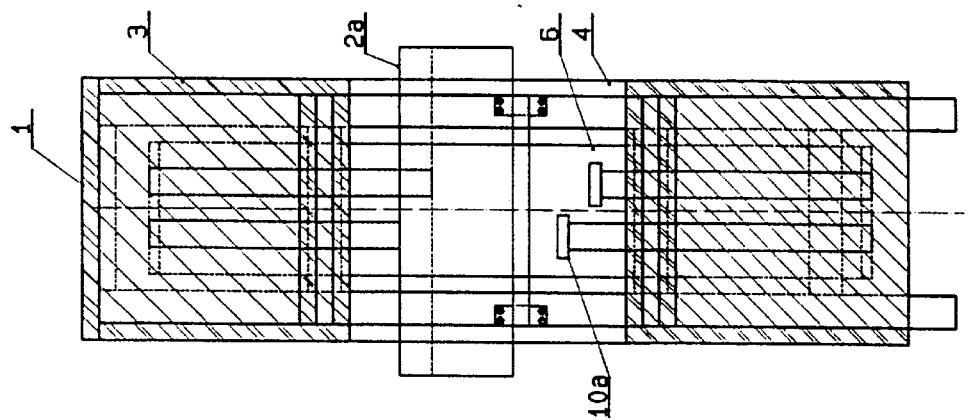

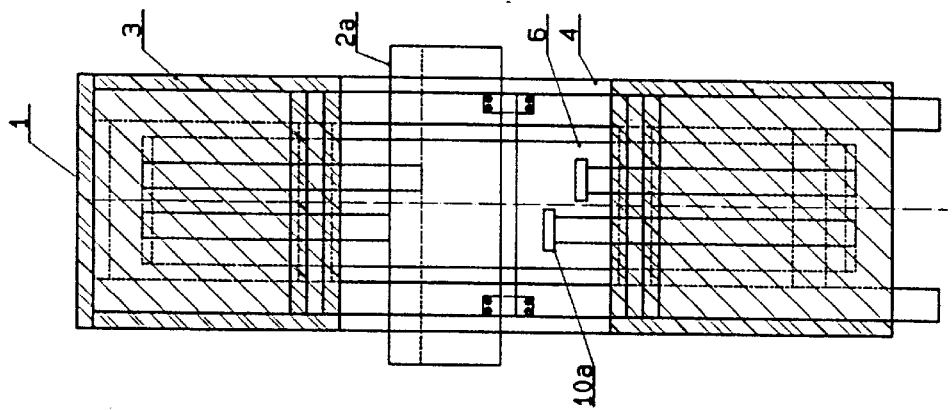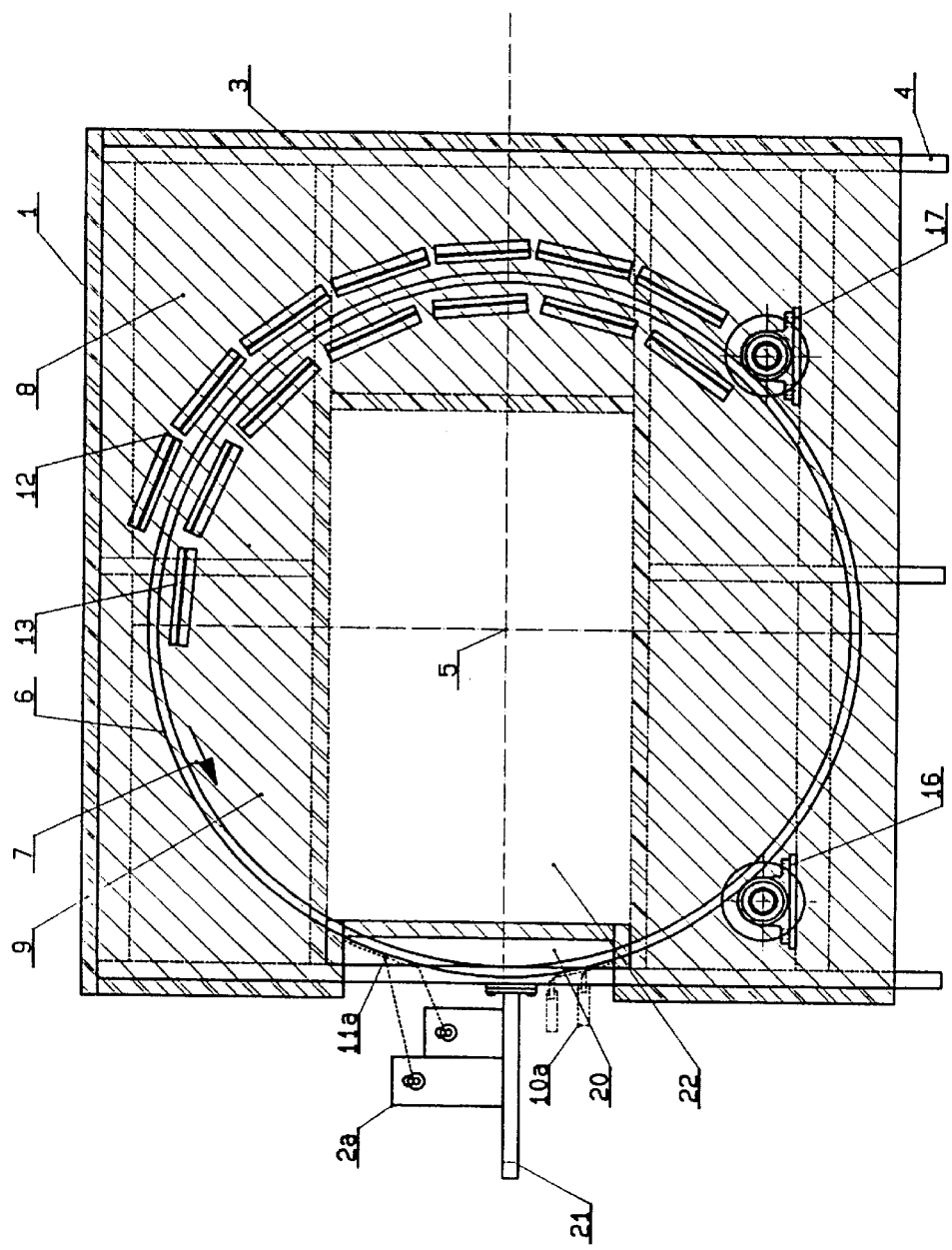

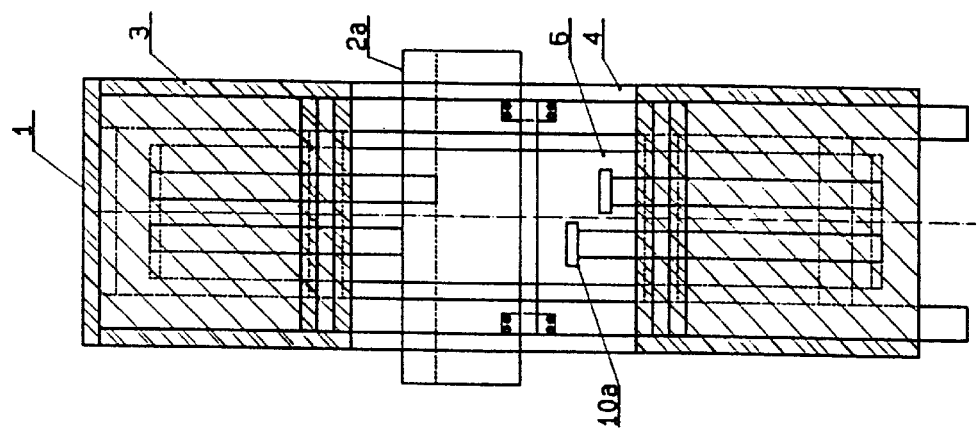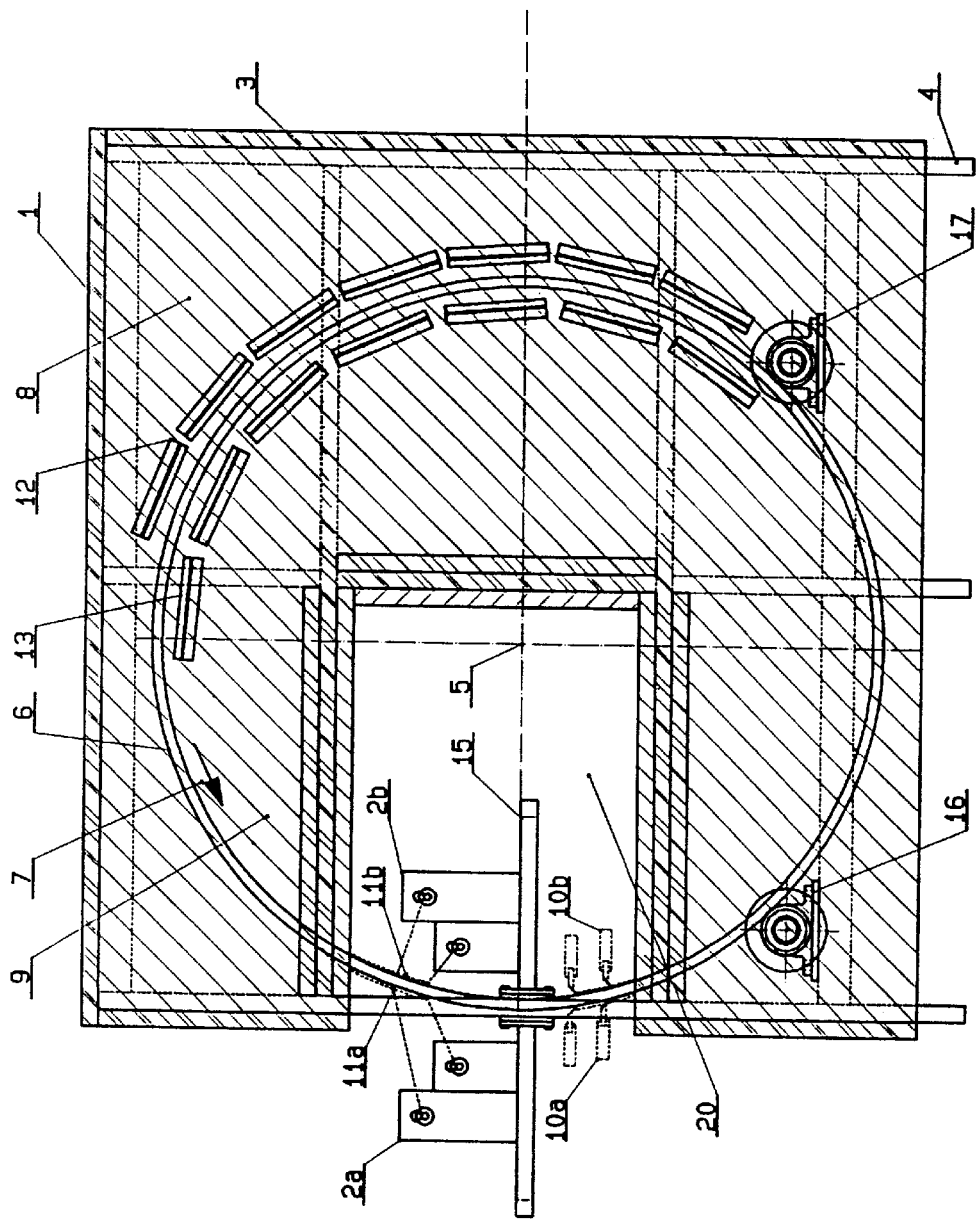

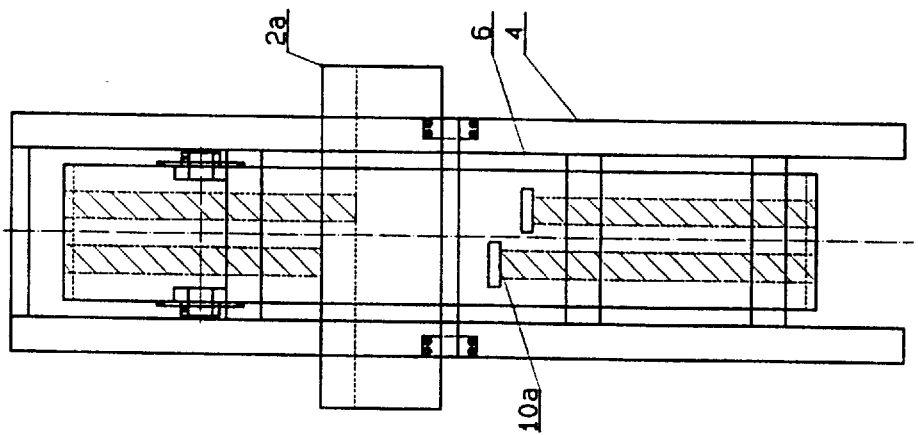
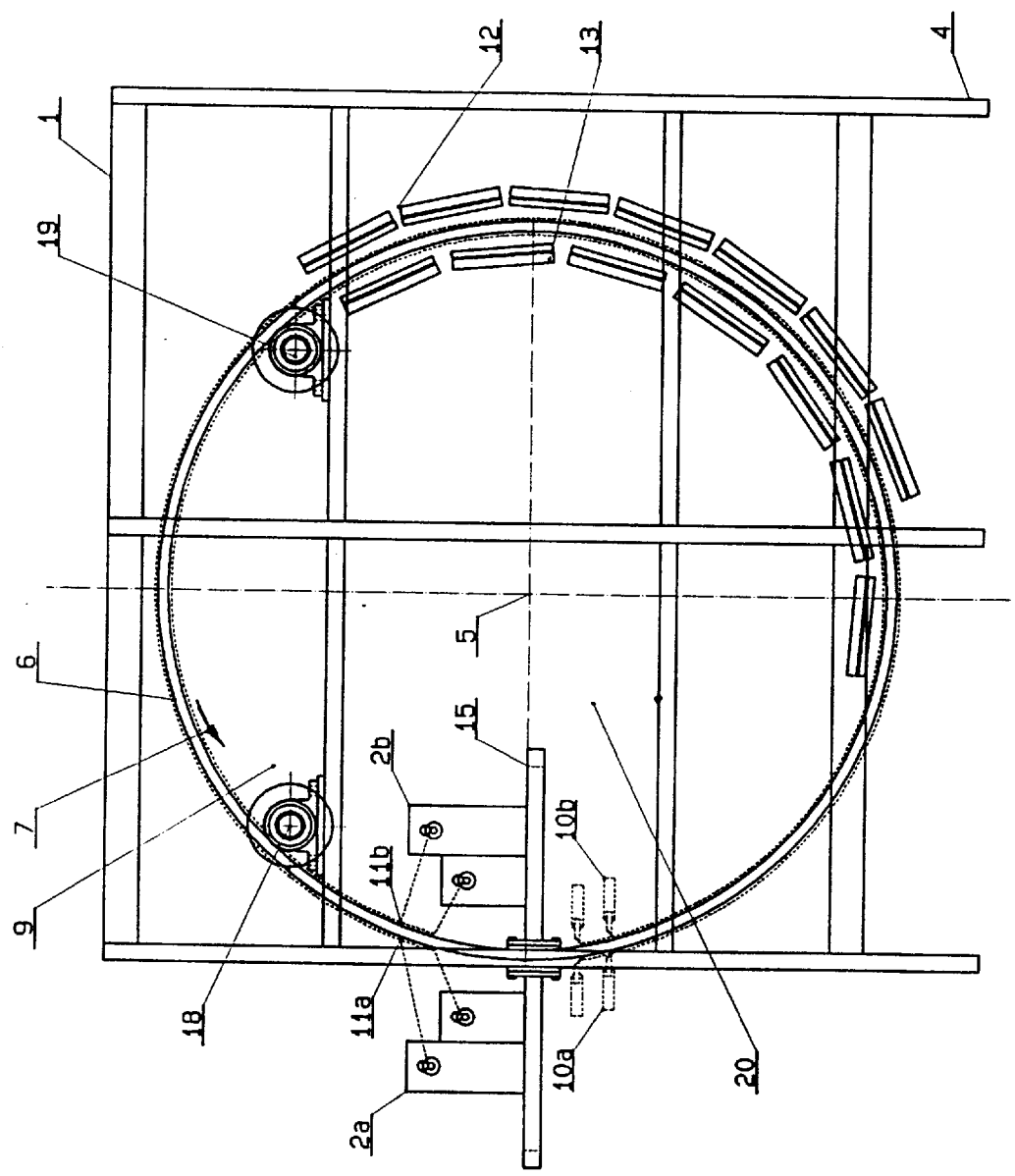

BAKING DEVICE FOR PRODUCTION OF ENDLESS STRIPS

CROSS REFERENCE TO RELATED APPLICATIONS

This application is a national stage of PCT/AT97/00052 filed Mar. 12, 1997 and based, in turn, upon Austrian national application A504/96 of Mar. 18, 1996 under the International Convention.

FIELD OF THE INVENTION

The invention relates to the production of endless strips of dough, consisting particularly of flour and water, which on heated, mobile and endless baking surfaces are transformed into endless dried strips through a drying or baking process. This strips are rolled up and temporarily stored as endless strips for further processing, or subdivided into separate layers and temporarily stored as layers for further processing, or separated into separate layers immediately after production, the separate layers being formed into three-dimensional objects, or are formed into three-dimensional objects immediately after production and subsequently separated into individual objects.

BACKGROUND OF THE INVENTION

Baking devices are known for preparing or producing endless strips of a food product, whereby a fluid or pasty dough consisting mainly of flour and water is continuously applied onto a continuously revolving baking surface and there transformed into an endless dried strip through a drying or baking process, this strip being continuously removed from the revolving baking surface.

Such baking devices are equipped with a continuously revolving baking surface carrier heated on its internal and external sides, which carries the revolving baking surface on its external side and transports the same through an external stationary baking zone, at whose beginning a dough application device and at whose end a strip removal device are provided. The dough application device forms an uninterrupted dough strip on the revolving baking surface, which is at least partially baked in the baking zone and at the end of the baking zone is continuously removed from the baking zone by the strip removal device.

In most cases a rotating baking drum is used as the revolving baking surface carrier. The hub of the baking drum is rotatably supported on a horizontally arranged rotation axle. The cylindrical shell of the baking drum is connected with the hub by a support structure and carries the baking surface on its outside. The baking drum surrounds a space containing the support structure and the hub of the baking drum, which also contains the heating device for the heating of the inner drum shell. The baking drum is surrounded by an outer space which contains the dough application device and the strip removal device of the outer stationary baking zone arranged successively in the rotation direction of the baking drum, as well as a heating device for heating the outer surface of the drum shell.

Such baking devices are used for producing baked goods, and for the production of endless wafer strips, which when still warm from baking can be plastically shaped and are further processed in continuously operating production lines to separate objects which in the cooled state are crisp and solid. The endless wafer strips which can be plastically shaped are produced from wafer dough with a high sugar content, which contain 25 to 100% by weight sugar in relation to the flour content of the wafer dough. The objects consisting of sugar-containing wafer dough can represent a final wafer product or an intermediate product in the production of other sweets, e.g. cream-filled wafers or chocolate-coated wafers, candy with fillings, etc. The objects made of plastically shaped sugar-containing endless wafer strips are for instance whole hollow bodies, such as deep cups, wafer rolls, hollow shells, wafer cones, ice cream cones, or also parts of hollow bodies interconnected by layer strips and which together with the layer strips form separate rectangular wafer layers provided with depressions formed by the hollow bodies, or also flat bowls, plates, flat slices, etc.

In the cylindrical baking drums of the known baking devices heat losses result due to the heating of the drum hub and of the support structure form-fittingly connecting the hub with the drum shell. Depending on the construction of the baking drum, the support structure can comprise two radial support plates arranged on the lateral margins of the drum shell, or a single support plate arranged in the middle of the drum shell or at one of its lateral margins.

The heating of the support structure of the baking drum prevents the destruction of the support structure and thereby of the baking drum due to heat stresses, but it produces an uneven heat flow in the drum shell, because the latter is cooled on its outer baking surface by the baked product during the baking process, while the support structure connected to the inside of the drum shell basically maintains an unchanged temperature. This leads to a cambering of the baking surface and to differences of up to 20% in the thickness of the baked endless strip, which have a negative effect on the products made from the respective endless strip. The heating of the support structure also requires heating energy which cannot be used in the baking process. In the production of endless wafer strips which can be plastically shaped in the warm baked stage the operating temperatures range between 200° C. and 250° C.

With the increasing size of the baking drum, increases not only the heat-storing mass of the drum shell, but also the masses of the drum hub and of the support structure, thereby increasing the heat losses of the baking device due to heating of these masses. From WO 95/32630 a baking device for the production of an endless wafer strip which in the warm state can be plastically shaped with a subsequent strip processing device is known. The endless strip is produced on the revolving baking surface carrier of the baking device, which is designed as a revolving baking drum or as a baking strip winding about two guide rollers arranged at a distance from each other. The wafer strip which can be plastically shaped in the warm state is subdivided in a strip processing device into separate fan-shaped wafer pieces, which in a subsequent rolling device are rolled into wafer cones. From Austrian Patent 380 151 a baking device is known for the production of a thin endless wafer strip which in warm state is plastically deformable with a subsequent strip processing device. In the baking device a thin wafer strip is baked on the outside of a revolving one-track baking drum. In the subsequent strip processing device the thin wafer strip is folded, in its longitudinal direction or transversely thereto, into an endless two-layered or multilayered laminated baked strip, which in its plastically deformable state is further processed in another subsequent strip processing device.

EP-A1 0 211 356 describes a baking device for the production of an endless wafer strip plastically deformable in the warm state with a subsequent strip processing device. In the baking device an endless wafer strip is baked on the outside of a revolving baking drum, and in a subsequent strip processing device is subdivided into separate wafer layers, which are then individually processed in the warm, plastically deformable state in a further processing device.

U.S. Pat. No. 3,829,593 a device for the production of an endless pliable strip describes, which immediately after production is rolled into a storage roll. The pliable strip is produced on the outside of a rotating baking drum in a single external baking zone and consists of a dough which is not completely baked on the outer surface of the baking drum. The strip which is pliable in the warm state immediately after production and in the cooled state is intended for the production of dough wraps for Chinese spring rolls, which are stuffed with a precooked filling and are deep-fried in oil until the dough wraps are browned.

DE-OS 24 35 110 describes an installation of the production of prefabricated spring rolls which will be later deep-fried in oil. In this installation on the outside of a revolving baking drum an endless strip of only partially baked dough is produced and this endless strip is fed to a subsequent processing device arranged at a distance, wherein the endless strip is divided into separate square pieces of dough and each piece is made into a prefabricated spring roll. In the processing device a precooked filling mass is put on a dough piece and the dough piece is wrapped around the filling mass to surround it, then rolled up.

OBJECT OF THE INVENTION

It is the object of the invention to eliminate the drawbacks of the known revolving baking surface carriers.

SUMMARY OF THE INVENTION

In order to attain this object, a baking device for the production of endless strips is provided with a baking surface carrier continuously revolving about a fixed axis of rotation. The carrier within the baking device separates an inner space from an outer. The outer side facing the outer space is heated by a heating device arranged in the outer space, and the inner side facing the inner space is heated by a heating device arranged in the inner space. This baking surface carrier has at least on its outer side at least one revolving baking surface, to which at least one outer stationary baking zone is assigned, comprising a dough application device and a subsequently arranged strip removal device in the rotation direction of the baking surface carrier. In this outer baking zone, a dough strip continuously formed on the revolving baking surface by the dough application device is at least partially baked during the rotation of the baking surface carrier, and the resulting formed endless dough strip is continuously removed from the revolving baking surface by the strip removal device.

According to the invention, in this baking device, the baking surface carrier is a hubless baking drum, whose drum shell has at least on its outer side at least one revolving baking surface, to which at least one fixed outer baking zone is assigned, which in the outer space comprises a dough application device and a strip removal device subsequently arranged in the rotation direction of the hubless drum. The hubless baking drum is supported by at least two bearings arranged at a distance from the axis of rotation so that it can revolve about the axis of rotation.

Compared to the known baking drums, in this construction of the revolving baking surface carrier the hub and the support structure connecting the same to the drum shell are eliminated. This eliminates also the heat losses due to the heating of the hub and the support structure. Furthermore also the temperature-caused elastic deformation of the drum shell or of the revolving baking surface carried by the same, due to the connection of the support structure to the drum shell, is also eliminated. The baking device according to the invention not only requires less energy for the production of endless strips than the known baking drums, but it also produces strips with a more uniform thickness.

According to a further feature of the invention, a housing surrounding the hubless baking drum and the fixed baking zone assigned to the respective baking surface can be provided, which in the inner space of the hubless baking drum surrounds at least one lateral chamber open towards the outside, whereby the heating device heating the inside of the hubless baking drum is arranged in the housing around the laterally outwards open chamber. This construction makes possible a further reduction of the heat losses due to the laterally outwards open chamber, which clearly reduces the inner heated space of the housing.

According to a further feature of the invention, the drum shell of the hubless baking drum can also have at least one revolving baking surface on its inner side facing the inner space, to which at least one inner fixed baking zone is assigned, which comprises in the inner space a dough application device and a strip removal device subsequently arranged in the rotation direction of the hubless drum, whereby in this inner baking zone a dough strip continuously formed on the revolving baking surface is at least partially baked during the rotation of the hubless baking drum and the thereby formed endless strip is continuously removed from the revolving baking surface, whereby the dough application device and the dough removal device of the respective inner baking zone are arranged in the laterally outwardly open chamber. This construction provides for one or more additional revolving baking surfaces with the respective fixed baking zones on the inside of the hubless drum. This results in a considerable increase of the productivity of the baking device of the invention, without increasing the construction volume of the baking device.

According to a further feature of the invention, at least one part of the area of the outer side of the hubless drum opposite to the inner baking zone can be free from outer baking zones and at least one part of the area of the inner side of the hubless drum opposite to the outer baking zone can be free from inner baking zones.

In a further embodiment of the invention, a device for the continuous production of separate objects made from endless strips comprises a baking device for the production of endless strips and at least one subsequently arranged strip processing device for an individual strip. This baking device is provided with a baking surface carrier continuously revolving about a fixed axis of rotation, which within the baking device separates an inner space from an outer space and on its outer side facing the outer space is heated by a heating device arranged in the outer space and on its inner side facing the inner space is heated by a heating device arranged in the inner space. The baking surface carrier has at least on its outer side at least one revolving baking surface, to which at least a fixed outer baking zone is assigned, which comprises a dough application device and a strip removal device arranged subsequently in the direction of the rotation direction of the baking surface carrier. In this outer baking zone a dough strip continuously formed on the revolving baking surface by the dough application device is at least partially baked during the rotation of the baking surface carrier and the thereby produced endless strip is removed from the revolving baking surface by the strip removal device and then fed to the respective strip processing device.

According to the this device is characterized in the baking surface carrier is a hubless baking drum, whose drum shell has at least on its outside at least one revolving baking surface, to which at least one fixed outer baking zone is assigned, which comprises in the outer space a dough application device and a strip removal device subsequently arranged in the direction of the rotation of the hubless baking drum, and that hubless baking drum is supported in at least two bearings arranged at a distance from the axis of rotation, so that it can rotate about the axis of rotation.

Compared to the known baking devices, in this construction of the hubless baking surface carrier the hub and the support structure connecting the same to the drum shell are eliminated. This way also the heat losses due to the heating of the hub and the support structure are eliminated. Furthermore it eliminates the temperature-depending elastic deformation of the drum shell, respectively of the baking surface carried by the same, caused by the connection of the support structure to the drum. With the device of the invention not only is less energy required for the production of the endless strips compared to the known baking drums, but also more uniform strips are obtained.

According to a further feature of the invention, the baking device can have a housing surrounding the hubless drum and the fixed baking zone assigned to the respective revolving baking surface, which in the inner space of the hubless baking drum surrounds at least one laterally outwards open chamber, whereby the heating device heating the inside of the hubless baking drum is arranged in the housing around the laterally outwards open chamber. This construction makes possible a reduction of the heat losses through the laterally outwards open chamber, which clearly reduces the heated inner space of the housing.

According to a further feature of the invention, the drum shell of the hubless baking drum can have also on its inner side facing the inner space at least one revolving baking surface to which at least one inner fixed baking zone is assigned, which in the inner space comprises a dough application device and a strip removal device arranged subsequently in the direction of rotation of the hubless baking drum, whereby in this inner baking zone a dough continuously formed by the dough application device on the revolving baking surface is at least partially baked during the rotation of the hubless drum and the thereby formed endless strip is removed from the revolving baking surface by the strip removal device and fed to the respective strip processing device, whereby the dough application device and the strip removal device of the respective inner baking zone and at least a part of the assigned strip processing device are arranged in the laterally outwards open chamber. This construction provides for one or more additional revolving baking surfaces with the respectively assigned fixed baking zones on the inside of the hubless drum, whose assigned strip processing device projects at least partially into the laterally outwards open chamber. This results in a considerable increase of the productivity of the device of the invention for the production of individual objects, without increasing the construction volume of such a device.

According to a further feature of the invention, also in the case of the device for the production of separate objects from endless strips, at least one part of the area of the outer side of the hubless baking drum opposite to an inner baking zone can be free of outer baking zones and at least one part of the area of the inner side of the hubless baking drum opposite to an outer baking zone can be free of inner baking zones.

BRIEF DESCRIPTION OF THE DRAWING

The above and other objects, features, and advantages will become more readily apparent from the following description, reference being made to the accompanying drawing in which:

FIG. 1 is a side view of an embodiment of a device for the production and processing of endless strips;

FIG. 2 is a front view of the device of FIG. 1;

FIG. 3 is a side view of a further embodiment of a device for the production and processing of endless strips;

FIG. 4 is a front view of the device of FIG. 3;

FIG. 5 is a side view of a further embodiment of a device for the production and processing of endless strips;

FIG. 6 is a front view of the device of FIG. 5;

FIG. 7 is a schematic cross section through a further embodiment of a device for the production and processing of endless strips; and FIG. 8 is a front view of the device of FIG. 7.

SPECIFIC DESCRIPTION

FIGS. 1 and 2 show a device for the continuous production of hollow wafer rolls or shells. In the stand 4 of the baking device 1 surrounded by a heat-insulating housing 3, a hubless drum 6 revolving about a fixed central axis 5 is rotatably supported in bearings arranged at a distance from the central axis 5 so that it rotates about this central axis 5.

The fixed central axis 5 is an imaginary axis of rotation, about which the hubless baking drum 6 revolves continuously in the direction of arrow 7.

Inside the baking device or the housing 3, the hubless baking drum 6 separates an outer space 8 faced by the outer side of the hubless baking drum 6, from an inner space 9 faced by the inner side of the hubless baking drum 6. In the baking device 1, in two outer baking zones arranged next to each other, two endless wafer strips are simultaneously produced which, overlapping in a screw-like manner, are continuously rolled into an endless tubular wafer by two strip processing devices 2a located close to the outside area of the hubless baking drum 6, and subsequently divided into separate wafer rolls or hollow shells.

In the outer space 8 along the hubless baking drum 6 a heating 12 device consisting of several heating elements is arranged for the heating of the outer side of the hubless baking drum 6.

In the inner space 9 along the hubless baking drum 6 a heating device 13, also consisting of several heating elements, is arranged for the heating of the inner side of the hubless baking drum 6.

In the stand 4 surrounded by a heat-insulating housing 3, the hubless baking drum 6 is rotatably supported in two bearings 16,17 arranged underneath the central axis 5 and at a distance from each other, and is set to rotate about the central axis 5 by at least one drive shaft arranged in one of the bearings 16, 17. The hubless baking drum 6 is heated on its inner side by heating elements 13, arranged in its inner space 9 along its periphery, and on its outer side by heating elements 12, arranged in the surrounding outer space 8 of the housing 3 along its periphery. On the frontal side of the baking device 1, the hubless baking drum 6 extends through a chamber 20 located outside the heat-insulating housing 3, which is open towards the front side of the baking device 1 and laterally outwards. The dough application devices 10a and the strip removal devices 11 of the two outer baking zones are arranged in this chamber 20. The chamber 20 extends from the front side of the baking device 1 into the inner space 9 in the proximity of the frontal side of the baking device 1 has an upper and a lower passage opening for the hubless baking drum 6 and for the dough strips baked thereon. The strip processing devices 2a assigned to the two outer baking zones are arranged on a support plate 21 mounted on the front side of the baking device 1.

FIGS. 3 and 4 show a further embodiment of a device for the continuous production and processing of two endless wafer strips, wherein next to the chamber 20 located outside of the heat-insulating housing 3 there is a further adjacent, laterally outwards open chamber 22, which extends into the inner space 9 surrounded by the hubless baking drum. This further laterally outwards open chamber 22 is surrounded by the basically C-shaped heat-insulating housing 3 for the baking device 1, thereby reducing the inner volume of the baking device 1 to be heated during the baking process.

FIGS. 5 and 6 show a device for the continuous production of wafer rolls or hollow shells by means of a baking device 1, wherein similar to the embodiment of FIGS. 3 and 4, the inner side of the cylindrical drum is also used as a baking surface, so that at the same time for instance four endless wafer strips can be produced and are processed by four strip processing devices 2a, 2b. In each of these, a wafer strip overlapping in a screw-like manner is rolled into an endless tubular wafer and divided into separate wafer rolls or hollow shells.

The hubless baking drum 6 consists only of a cylindrical drum shell, which has two endless baking surfaces arranged next to each other on each of its outer side and its inner side, to which an outer respectively inner fixed baking zone is assigned. Each outer baking zone comprises an outer dough application device 10a, arranged at its beginning and fastened to the stand 4, and an outer strip removal device 11a, arranged subsequently thereto in the rotation direction 7 of the drum shell and fastened to the stand 4 at the end of the outer baking zone. Each inner baking zone comprises an inner dough application device 10b, arranged at is beginning in the inner space 9 and fastened on the stand 4, and an inner strip removal device 11b subsequently arranged in the rotation direction 7 of the drum shell, which is fastened on the stand 4 at the end of the inner baking zone in the inner space 9. The outer and inner strip removal devices 11a, 11b are only symbolically represented in the drawing.

The hubless baking drum 6 revolving in the stand 4 in the direction of arrow 7 is supported rotatably about the central axis 5 in bearings 16 and 17 arranged in the outer space 8 underneath the central axis 5. The bearings 16 and 17 are arranged symmetrically with respect to the perpendicular plane running through the central axis 5. the hubless baking drum 6 resting with the lateral rims of its drum shell on the bearings 16 and 17 is set to rotate about the central axis 5 by at least one drive shaft, which is connected to one of the bearings 16, respectively 17.

The basically C-shaped housing 3 surrounds the hubless baking drum 6 with its outer and inner revolving baking surfaces and the respectively thereto assigned outer and inner fixed baking zones and also the respectively assigned heating devices 12, 13 in the outer space 8 or the inner space 9. Further in the inner space 9 the housing 3 surrounds a chamber 20 open towards the frontal side of the baking device 1 and laterally outwards, wherein the outer or inner dough application devices 10a or 10b and the outer, respectively inner strip removal devices 11a or 11b, are arranged. The chamber 20 extends from the frontal side of the baking device 1 into the inner space 9 and in the vicinity of the frontal side of the baking device 1 has an upper and a lower passage opening for the hubless baking drum 6 and the dough strips baked thereon. The heating device 13 heating the inner side of the hubless baking drum 6 is arranged in the inner space 9 of the housing 3 along the hubless baking drum 6 and around the laterally outwards open chamber 20.

The four strip processing devices 2a, 2b, each assigned to one fixed baking zone, are mounted on a horizontal support frame 15, which is arranged at the frontal side of the baking device 1 and extends into the chamber 20. The two outer strip processing devices 2a assigned to the two outer baking zones are arranged on the horizontal support frame 15 outside the hubless baking drum 6, close to the frontal side of the baking device 1. The two inner strip processing devices 2b assigned to the two inner baking zones are arranged inside the chamber 20 on the horizontal support frame 15 and inside the hubless drum 6 close to the frontal side of the baking device 1. In the case of each fixed baking zone the strip removal devices 11a, 11b, can be integrated in the respective strip processing device 2a respectively 2b, or formed by the latter, so that the respective strip processing device 2a or 2b, represents itself the strip removal device and there is no need for a separate strip removal device.

FIGS. 7 and 8 show schematically a further embodiment of a device for the continuous production and processing of four endless wafer strips, whereby for the sake of a better overview, the outer heat-insulating housing is not shown. This device differs from the one of FIGS. 5 and 6 with regard to the suspension of the baking cylinder forming the hubless baking drum 6. The baking cylinder 6 revolving in the stand 4 about the central axis 5 in the direction of arrow 7 rests on its inner side with its lateral rims on two bearings 18 and 19, arranged in the inner space 9 above the central axis 5. The bearings 18, 19 are arranged symmetrically with respect to the perpendicular plane running through the central axis 5. At least one of the bearings 18, 19 is connected with a drive shaft, which engages with the baking cylinder 6 and sets it into rotation.

It is self-understood that the present invention is not limited to the illustrated embodiments and those described in detail for the production of endless wafer strips and their processing into wafer rolls or hollow shells.

The hubless baking drum 6 of the baking device 1 can also have a single revolving baking surface on its outer side, to which along the cylindrical drum shell only one outer fixed baking zone is assigned, wherein a single endless strip is produced. In a baking drum 6 of a larger diameter it is also possible to assign to the revolving baking surface, arranged on the outer side of the drum shell, two outer fixed baking zones arranged one after the other in the rotating direction of the baking drum 6. In each of the zones a single endless strip is produced. Furthermore also on the inner side of the drum shell it is possible to have only a single revolving baking surface, to which along the drum shell only one, or two or more inner baking zones are arranged one after the other in the direction of the rotation of the baking drum 6. On the outer side, as well as on the inner side of the drum shell of the hubless baking drum 6 it is possible to arrange two or more revolving baking surfaces next to each other, whereby to each separate revolving baking surface only one, or two or more inner or outer baking zones can be assigned, arranged one after the other in the rotation direction of the baking drum 6, in each of them a single endless strip being produced.

Furthermore in the devices of the invention it is possible to replace the strip processing devices for rolling the endless wafer strips, overlapping in a screw-like manner, into an endless tubular wafer with other strip processing devices for the production of other objects. Also it is possible to use other kinds of dough than the wafer dough in the baking devices for the production of endless, more or less fully baked strips.

We claim:

1. A baking device for the production of endless strips, comprising:

a baking surface carrier continuously revolving about a fixed axis of rotation and separating an inner space from an outer space;

means for heating said carrier on an outer side facing the outer space and including a heating device arranged in the outer space;

means for heating said carrier on its inner side facing the inner space and including a heating device arranged in the inner space, said carrier having at least on its outer side at least one revolving baking surface to which at least one outer fixed baking zone is assigned;

a dough application device and a strip removal device arranged successively in a rotation direction of the baking surface carrier, whereby in this outer baking zone a dough strip continuously formed by the dough application device onto the revolving baking surface is at least partially baked during the rotation of the baking surface carrier and the thereby formed endless strip is continuously removed from the revolving baking surface by the strip removal device, said baking surface carrier being a hubless baking drum having a drum shell with at least one revolving baking surface on an outside of the drum and to which at least one outer fixed baking zone is assigned which in the outer space comprises at least one of said dough application devices and a respective one of the strip removal devices arranged subsequently thereto in the rotation direction of the hubless baking drum, the hubless baking drum being supported rotatably about an axis of rotation in at least two bearings arranged at a distance from the axis of rotation.

2. The device according to claim 1, wherein a housing is provided which surrounds the hubless baking drum and the fixed baking zone assigned to the respective revolving baking surface, which in the inner space of the hubless baking drum has at least one laterally outwardly open chamber, whereby the heating device heating the inner side of the hubless baking drum is arranged in the housing around the laterally outwardly open chamber.

3. The device according to claim 2, the drum shell of the hubless baking drum has at least one revolving baking surface also on its inner side facing the inner space and to which at least one inner fixed baking zone is assigned, which comprises in the inner space a respective dough application device and a respective strip removal device arranged in succession in the rotation direction of the hubless baking drum, whereby in this inner baking zone a dough strip continuously formed by the dough application device is at least partially baked during the rotation of the hubless baking drum and the thereby formed endless strip is continuously removed from the revolving baking surface by the respective strip removal device, and that the dough application device and the strip removal device of the respective inner baking zone are located in the laterally outwardly open chamber.

4. The device according to claim 3, wherein at least one part of an area of the outer side of the hubless drum opposite to the inner baking zone is free from outer baking zones and that at least one part of an area of the inner side of the hubless baking drum opposite to the outer baking zone is free of inner baking zones.

5. An apparatus for the continuous production of separate objects from endless strips with a baking device for the production of the endless strips and at least one subsequent strip processing device for a separate strip, whereby the baking device is provided with a baking surface carrier continuously revolving about a fixed axis of rotation, which within the baking device separates an inner space from an outer space, is heated on its outer side facing the outer space by a heating device arranged in the outer space and on its inner side facing the inner space by a heating device arranged in the inner space and has at least on its outer side at least one revolving baking surface to which at least one outer fixed baking zone is assigned, which comprises a dough application device and a strip removal device arranged subsequently thereto in the rotation direction of the baking surface carrier, whereby in this outer baking zone a dough strip continuously formed by the dough application device on the revolving baking surface is at least partially baked during the rotation of the baking surface carrier and the thereby formed endless strip is continuously removed from the revolving baking surface by the strip removal device and fed to the respective strip processing device, the baking surface carrier of the baking device being a hubless baking drum with a drum shell having at least on an outer side thereof said least one revolving baking surface to which at least one outer fixed baking zone is assigned, said dough application device and said strip removal device being arranged successively thereto in the rotation direction of the hubless baking drum in the outer space, and said hubless baking drum being supported rotatably about the axis of rotation in at least two bearings arranged at a distance from the axis of rotation.

6. The apparatus according to claim 5, wherein the baking device has a housing surrounding the hubless baking drum and the fixed baking zone assigned to the respective revolving baking surface, which in the inner space of the hubless baking drum surrounds at least one laterally outwards open chamber, whereby the heating device heating the inner side of the hubless baking drum is arranged in the housing around the laterally outwards open chamber.

7. The apparatus according to claim 6, wherein the drum shell of the hubless baking drum has also on its inner side facing the inner space at least one revolving baking surface to which at least one inner fixed baking zone is assigned, which comprises a dough application device and a strip removal device arranged subsequently thereto in the rotation direction of the hubless baking drum, whereby in this inner baking zone a dough strip continuously formed on the revolving baking surface by the dough application device is at least partially baked during the rotation of the hubless baking drum and the thereby formed endless strip is removed from the revolving baking surface by the strip removal device and fed to the respective strip processing device, and that the dough application device and the strip removal device of the respective inner baking zone and at least one part of the assigned strip processing device are arranged in the laterally outwards open chamber.

8. The apparatus according to claim 7, wherein at least one part of an area of the outer side of the hubless baking drum opposite to the inner baking zone is free of outer baking zones and that at least one part of the inner side of the hubless baking drum opposite to the outer baking zone is free of inner baking zones.

* * * * *

UNITED STATES PATENT AND TRADEMARK OFFICE
CERTIFICATE OF CORRECTION

| | |
|---|---|
| PATENT NO. : | 5,988,047 |
| DATED : | November 23, 1999 |
| INVENTOR(S) : | Franz Haas, Sen. et al |

It is certified that error appears in the above-identified patent and that said Letters Patent is hereby corrected as shown below:

On the title Page:

In item: [75] for the first inventors name read

-- Franz Haas, Sen. --

Signed and Sealed this

Eleventh Day of July, 2000

Attest:

Q. TODD DICKINSON

*Attesting Officer*　　　　*Director of Patents and Trademarks*